(12) United States Patent
Mohtadi

(10) Patent No.: US 8,097,235 B2
(45) Date of Patent: Jan. 17, 2012

(54) BRONSTED ACID DESTABILIZATION OF COMPLEX METAL HYDRIDES

(75) Inventor: Rana F. Mohtadi, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 222 days.

(21) Appl. No.: 12/488,665

(22) Filed: Jun. 22, 2009

(65) Prior Publication Data

US 2010/0322846 A1    Dec. 23, 2010

(51) Int. Cl.
*C01B 3/00* (2006.01)
(52) U.S. Cl. .................................................. 423/658.2
(58) Field of Classification Search ........................ None
See application file for complete search history.

(56) References Cited

U.S. PATENT DOCUMENTS

| | | | |
|---|---|---|---|
| 5,279,805 A | 1/1994 | Miremadi et al. | |
| 5,605,585 A | 2/1997 | Yamamoto et al. | |
| 6,238,822 B1 | 5/2001 | Imoto et al. | |
| 6,255,018 B1 | 7/2001 | Ise et al. | |
| 6,528,441 B1 | 3/2003 | Heung et al. | |
| 7,078,126 B2 | 7/2006 | Imoto et al. | |
| 2005/0032641 A1* | 2/2005 | Zidan et al. | 502/400 |
| 2008/0172932 A1 | 7/2008 | Kelly et al. | |
| 2008/0256858 A1* | 10/2008 | Fuller et al. | 48/174 |

* cited by examiner

*Primary Examiner* — Emily Le
*Assistant Examiner* — Michael Forrest
(74) *Attorney, Agent, or Firm* — Gifford, Krass, Sprinkle, Anderson & Citkowski, P.C.

(57) ABSTRACT

In one aspect, there is disclosed a process of forming a hydrogen material including the steps of providing a metal hydride material, providing a Bronsted acid material, combining the metal hydride material and Bronsted acid material, and pyrolyzing the combined material forming a hydrogen storage material having a hydrogen release temperature less than the metal hydride material.

14 Claims, 1 Drawing Sheet

BRONSTED ACID DESTABILIZATION OF COMPLEX METAL HYDRIDES

FIELD OF THE INVENTION

The invention relates to hydrogen storage materials and with more particularity to hydrogen storage materials that are destabilized having improved thermodynamic properties.

BACKGROUND OF THE INVENTION

Current technologies utilized for gaseous hydrogen storage are limited by the low volume storage gas density even at very high pressures such as in the range of from 5,000 to 10,000 psi. The energy density by volume of gaseous hydrogen is less than that of a gasoline energy density. Use of hydrogen as an alternate fuel source is limited due to this lower energy density. Cryogenic storage of hydrogen at temperatures of around 20 Kelvin may improve the volumetric energy density compared to gaseous storage but is still less than that for a given amount of energy compared to gasoline. Additionally, production of liquid hydrogen is energy intensive and requires special considerations due to the low temperature storage to avoid hydrogen boil off and other limitations of a liquefied hydrogen fuel source.

Chemical storage of hydrogen in a solid material including metal hydrides allows for hydrogen release when heated or mixed with water. However, formation of solid byproducts as well as the release of hydrogen at very high temperatures, sometimes even exceeding the melting point of a metal hydride material, limits the use of such materials. Additionally, metal hydride materials are typically not able to be rehydrated after hydrogen release.

There is therefore a need in the art for an improved hydrogen storage material that releases hydrogen at lower temperatures and is able to be rehydrated after release of the hydrogen so that onboard storage becomes feasible

SUMMARY OF THE INVENTION

In one aspect, there is disclosed a process of forming a hydrogen storage material including the steps of providing a metal hydride material, providing a Bronsted acid material, combining the metal hydride material and Bronsted acid material, and pyrolyzing the combined material forming a hydrogen storage material having a hydrogen release temperature less than the metal hydride material.

In another aspect, there is disclosed a process of forming a hydrogen storage material that includes the steps of providing a metal hydride material, providing a Bronsted acid material, combining the metal hydride material and Bronsted acid material, and pyrolyzing the combined material forming a hydrogen storage material wherein hydrogen bonds of the metal hydride material are destabilized.

DETAILED DESCRIPTION OF THE PREFERRED EMBODIMENTS

Figure 1:
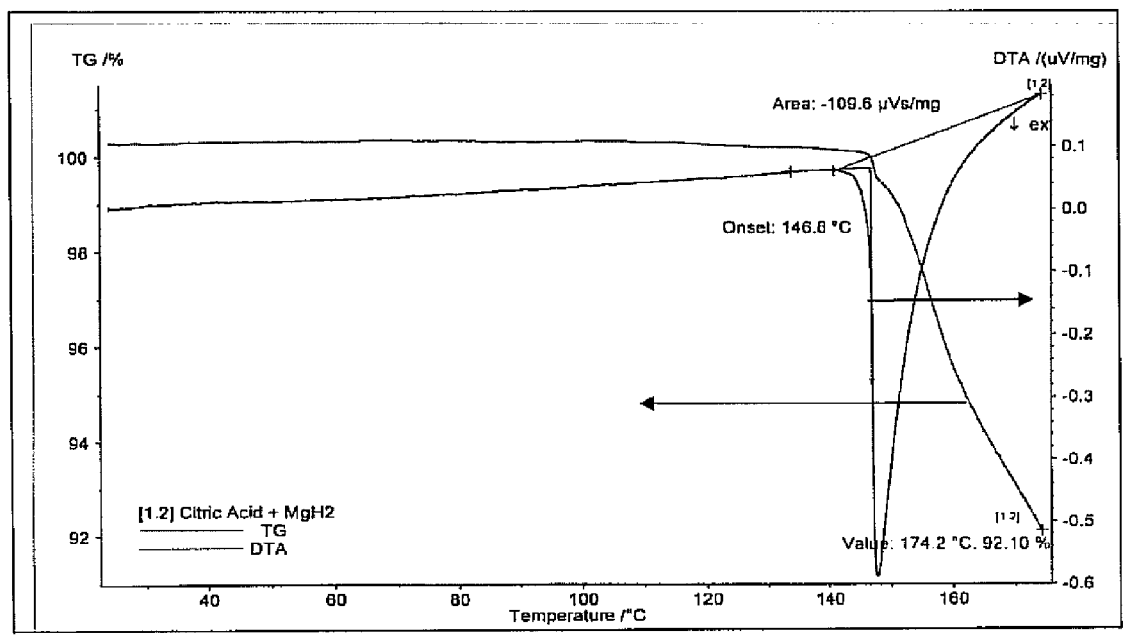
FIG. 1 is a plot of the TG-DTA data of one example of citric acid combined with magnesium hydride.

In one aspect, a hydrogen storage material may be formed from a metal hydride material that is combined with a Bronsted acid material. The combined material is then pyrolyzed forming a hydrogen storage material having a hydrogen release temperature less than the metal hydride material.

In one aspect, the metal hydride material may be a metal hydride of the formula $MH_x$ wherein M is an alkaline or alkaline earth metal and $1 \leq x \leq 2$. The metal hydride may also be a metal containing borohydride of the formula $M(BH_4)_x$ where M is an alkali metal or an alkaline earth metal and $1 \leq x \leq 2$.

In one aspect, various metal hydrides may be utilized as described above. Such metal hydrides may include combinations of the materials described above as well as individual species. For example, such metal hydrides may include magnesium hydride, calcium hydride, lithium hydride, titanium hydride, zirconium hydride and various combinations of the above materials.

As stated above, the metal hydride material is combined with a Bronsted acid material. In one aspect, Bronsted acid materials may include mineral acids, sulphonic acids and organic acids such as carboxylic acids. For example, acids such as: _citric acid, diaminobenzoic acid, ascorbic acid may be utilized. In one aspect, the Bronsted acid material may be a solid mixture or a nonvolatile liquid that may be combined with the metal hydride material. The liquid acids may be mounted into an inorganic support such as silica or alumina and an organic polymeric support such as Nation. The Bronsted acid material may be present in the combination in an amount of from 1 to 15% molar in relation to the metal hydride material. Additionally, the Bronsted acid material may have a pKa of from $1*10^{-16}$ to 20.

In one aspect, the combination of the metal hydride material with the Bronsted acid material would allow destabilization of the hydride material such that the protonic sites of the acid would interact with the hydritic sites on the hydride such that hydrogen gas is released. The destabilization reaction is indicated as below in the formula wherein the acid protonic sites are shown interacting with the hydritic sites on the hydride such as the metal hydrogen bond length is increased leading to hydride destabilization and compound dissociation to form a hydrogen gas and a metal.

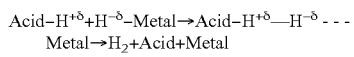

$$\text{Acid-H}^{+\delta} + \text{H}^{-\delta}\text{-Metal} \rightarrow \text{Acid-H}^{+\delta}\text{---H}^{-\delta}\text{---}$$
$$\text{Metal} \rightarrow \text{H}_2 + \text{Acid} + \text{Metal}$$

In another aspect, the combination of the metal hydride material with the Bronsted acid material would allow destabilization of the hydride material such that the protonic sites of the acid would react with the hydritic sites on the hydride such that hydrogen gas as well as a salt of the acid and hydride is formed The destabilization of the hydrogen bonds of the hydride material allows for a lower hydrogen release temperature in comparison to a metal hydride material that has not been combined with the Bronsted acid material.

In one aspect, the metal hydride material may be processed in a ball mill prior to reacting with the Bronsted acid material. Additionally, the metal hydride material and Bronsted acid material may be combined in a ball mill or may be combined by mixing of solids or the addition of a either free or support mounted nonvolatile liquid acid to the solid metal hydride material. In one aspect, the mixture may be ball milled from 1 to 10 hours at temperatures ranging from 77 Kelvin to room temperature such that the particles of the combined material have a size ranging from about 50 to 100 nanometers.

Following the combination of the metal hydride material and Bronsted acid material, the combined material may be pyrolyzed forming a hydrogen storage material having a hydrogen release temperature less than the metal hydride material. In one aspect, the combined materials may be pyrolyzed to a temperature below the melting point of the Bronsted acid material. Additionally, following release of the hydrogen from the hydrogen storage material the formed material may be reversely hydrogenated at temperatures of up to 400 degrees centigrade and at hydrogen pressures of up to 300 bars. In this manner, the storage material may be reversely hydrogenated for further use.

EXAMPLES

In the following example magnesium hydride having the formula $MgH_2$ was selected as the metal hydride material and citric acid having the formula $C_6H_8O_7$ was selected as the Bronsted acid material. The citric acid included the pKa1 of 3.5, pKa2 of 4.77 and pKa3 of 6.4 and includes a high melting temperature of 153 degrees centigrade and includes 4 OH acidic sites. 0.0431 grams of citric acid were milled in a mortar and pestle with 0.1120 grams of magnesium hydride. The molar ratio of citric acid relative to the magnesium hydride was 5% based on a molecular weight of 192 grams per mole for citric acid and 26.3 grams per mole of magnesium hydride.

19.602 milligrams of the prepared combination of magnesium hydride and citric acid were placed in a stainless steel Thermal Gravimetric analyzer-Differential temperature analyzer TG-DTA . . . The TG-DTA results are plotted in FIG. 1. As can be seen in FIG. 1, the blue line represents the DTA powder temperature change while the green line represents the TGA results due to weight loss. As can be seen in the graph, an exotherm at the melting temperature of citric acid was observed with the onset at about 146. Degrees C ta. Additionally, at the same time there is an observed weight loss at the noted melting point of the citric acid material. The total weight loss observed up to 174.2 degrees centigrade was equal to 7.9% having an equivalent weight of 1.548 milligrams. It is believed that at the acid melting point hydrogen gas formation takes place along with the formation of a magnesium citrate based intermediate The amount of weight loss is similar to the theoretical 7.6 wt % $H_2$ content of $MgH_2$ proving complete hydride decomposition to hydrogen. Additionally, the reaction took place before the citric acid first decomposition to the first water molecule and solid aconitic acid at a temperature above 175 degrees centigrade.

Although preferred embodiments of the invention have been described using specific terms, devices and methods, such description is for illustrative purposes only. The words used are words of description rather than of limitation. It is to be understood that changes and variations may be made by those of one of skill in the art without departing from the scope of the present invention which is set forth in the following claims. In addition, it should be understood that aspects of the various embodiments may be interchanged both in whole and in part. Therefore, the spirit and scope of the appended claims should not be limited to the description of the preferred embodiments contained within.

The invention claimed is:

1. A process of forming a hydrogen storage material comprising the steps of:
   providing a metal hydride material;
   providing a Bronsted acid material;
   combining the metal hydride material and Bronsted acid material wherein the Bronsted acid material is present in an amount of from 1 to 15% molar in relation to the metal hydride material; and
   pyrolyzing the combined material at a temperature less than the melting point of the Bronsted acid material forming a hydrogen storage material having hydrogen release temperature less than the metal hydride material.

2. The process of claim 1 wherein the metal hydride material is selected from the group consisting of: $MH_x$ wherein M is an alkaline or alkaline earth metal and $1 \leq x \leq 2$; and $M(BH_4)_x$ where M is an alkali metal or an alkaline earth metal and $1 \leq x \leq 2$.

3. The process of claim 1 wherein the Bronsted acid material is a solid mixture or a nonvolatile liquid.

4. The process of claim 1 wherein the Bronsted acid material is selected from the group consisting of: mineral acids, sulphonic acids and organic acids.

5. The process of claim 1 wherein the Bronsted acid material has a pKa of from $1*10^{-16}$ to 2.

6. The process of claim 1 wherein the step of combining the metal hydride material and Bronsted acid material includes ball milling the materials.

7. The process of claim 1 wherein the hydrogen storage material may be reversibly hydrogenated at temperatures up to 400 degrees centigrade and at hydrogen pressures up to 300 bars.

8. A process of forming a hydrogen storage material comprising the steps of:
   providing a metal hydride material;
   providing a Bronsted acid material;
   combining the metal hydride material and Bronsted acid material wherein the Bronsted acid material is present in an amount of from 1 to 15% molar in relation to the metal hydride material; and
   pyrolyzing the combined material at a temperature less than the melting point of the Bronsted acid material forming a hydrogen storage material wherein hydrogen bonds of the metal hydride material are destabilized.

9. The process of claim 8 wherein the metal hydride material is selected from the group consisting of: $MH_x$ wherein M is an alkaline or alkaline earth metal and $1 \leq x \leq 2$; and $M(BH_4)_x$ where M is an alkali metal or an alkaline earth metal and $1 \leq x \leq 2$.

10. The process of claim 8 wherein the Bronsted acid material is a solid mixture or a nonvolatile liquid.

11. The process of claim 8 wherein the Bronsted acid material is selected from the group consisting of: mineral acids, sulphonic acids and organic acids.

12. The process of claim 8 wherein the Bronsted acid material has a pKa of from $1*10^{-16}$ to 20.

13. The process of claim 8 wherein the step of combining the metal hydride material and Bronsted acid material includes ball milling the materials.

14. The process of claim 8 wherein the hydrogen storage material may be reversibly hydrogenated at temperatures up to 400 degrees centigrade and at hydrogen pressures up to 300 bars.

* * * * *

UNITED STATES PATENT AND TRADEMARK OFFICE
CERTIFICATE OF CORRECTION

| | | |
|---|---|---|
| PATENT NO. | : 8,097,235 B2 | Page 1 of 1 |
| APPLICATION NO. | : 12/488665 | |
| DATED | : January 17, 2012 | |
| INVENTOR(S) | : Rana F. Mohtadi | |

It is certified that error appears in the above-identified patent and that said Letters Patent is hereby corrected as shown below:

Col. 2, line 5: replace "$1 \leqq \times \leqq 2$" with --$1 \leq \times \leq 2$--;

Col. 2, line 8: replace "$1 \leqq \times \leqq 2$" with --$1 \leq \times \leq 2$--;

Col. 4, line 11: replace "$1 \leqq \times \leqq 2$" with --$1 \leq \times \leq 2$--;

Col. 4, line 42: replace "$1 \leqq \times \leqq 2$" with --$1 \leq \times \leq 2$--;

Col. 4, line 44: replace "$1 \leqq \times \leqq 2$" with --$1 \leq \times \leq 2$--.

Signed and Sealed this
Seventh Day of August, 2012

David J. Kappos
*Director of the United States Patent and Trademark Office*